Nov. 30, 1926.
J. R. GAMMETER
1,608,933
SEALING RING FOR VULCANIZING TIRES
Filed July 31, 1925
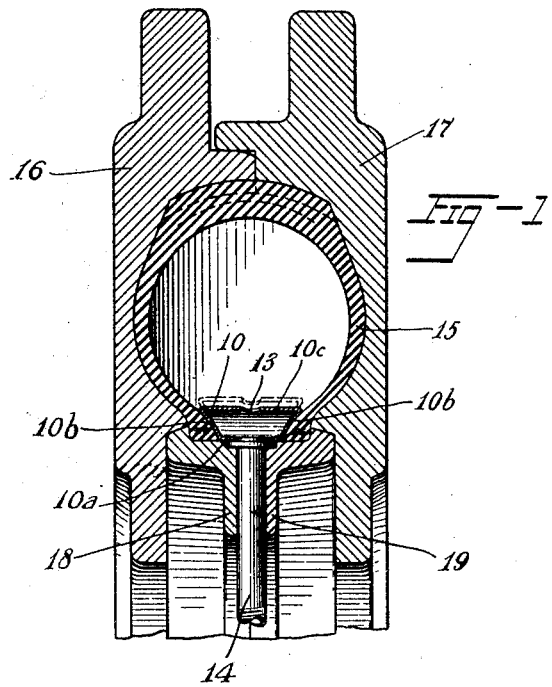
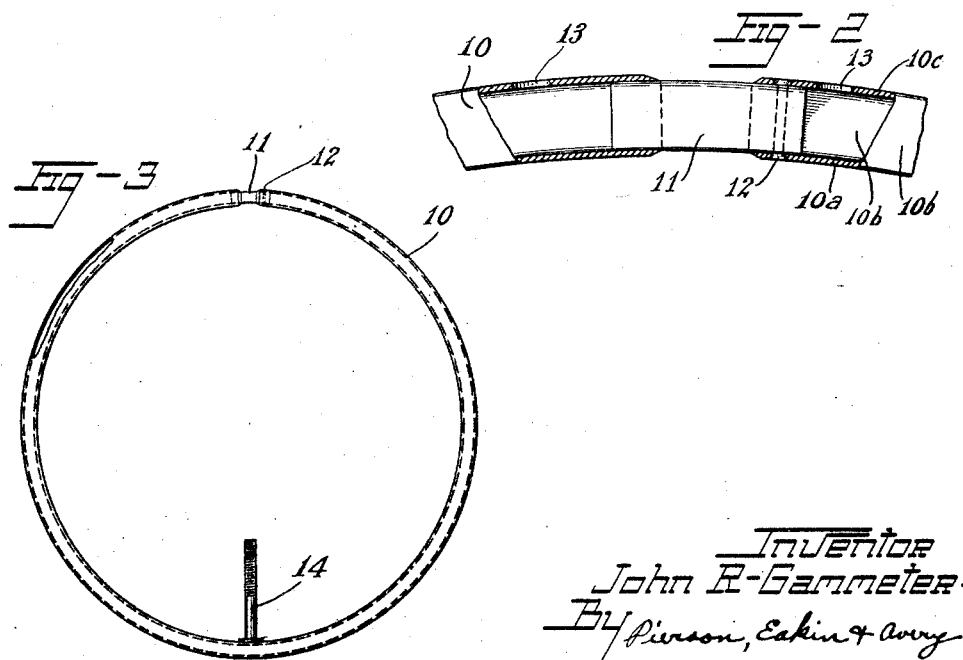
Inventor
John R. Gammeter
By Pierson, Eakin & Avery
Attys.

Patented Nov. 30, 1926.

1,608,933

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

SEALING RING FOR VULCANIZING TIRES.

Application filed July 31, 1925. Serial No. 47,258.

This invention relates to sealing rings for closing the space between the beads of a pneumatic tire during a vulcanizing operation in which the tire is filled with a pressure fluid directly contacting the inner surface of the tire.

My chief object is to provide an improved sealing ring adapted to exert upon the bead portions of the tire a molding force generally proportional to the fluid pressure within the tire and consequently proportional to the requirement for effecting a proper seal, and at the same time to permit the pressure fluid to contact the inner surface of the tire throughout the rest of the latter's extent. A more specific object is to provide a sealing ring which may be used as described without causing a ridge to form upon the inner face of the tire at the margin of the sealing ring during the vulcanization of the tire, as has frequently occurred when the bead portions of the tire have been forced axially of the tire against a rigid sealing ring by the closing of the mold sections upon the tire.

Of the accompanying drawings:

Fig. 1 is a cross-section of a mold assembly, including a preferred form of my sealing ring, and a tire therein.

Fig. 2 is a longitudinal, radial section of a portion of the sealing ring.

Fig. 3 is an elevation of the sealing ring, a part being broken away more clearly to show its structure.

Referring first to Figs. 1 to 3 of the drawings, the sealing ring there shown comprises a transversely split, hollow, metal annular member 10 of approximately trapezoid form in cross-section, the said member so formed that when unrestrained its ends gap apart as shown clearly in Figs. 2 and 3. Bridging the gap and telescoped within the two ends of the member 10 is a bridge member 11, preferably hollow and having open ends, the bridge member being secured by a rivet 12 in one end of the member 10 and being adapted to slide in the other end of said member to permit the latter to be expanded and contracted.

The inner peripheral wall $10^a$ and the side walls $10^b$, $10^b$ of the member 10 are imperforate, to prevent escape of fluid from the tire, while the outer peripheral wall $10^c$ of the said member is formed with apertures 13, 13 to provide communication between the interior of the sealing ring and the rest of the tire cavity and thus permit circulation of pressure fluid or heating fluid whereby the advantages may be had of avoiding deforming of the outer peripheral wall of the ring by fluid pressure thereon and of providing heating fluid in close proximity to the inner surfaces of the bead portions of the tire and thus, by the transfer of heat through the thin metal wall of the ring, subjecting the said bead portions to substantially the same heating conditions as the rest of the tire. A fluid inlet stem, 14, is provided for conducting fluid into the tire.

In the use of this embodiment of the invention the ring is mounted between the bead portions of the tire, 15, and the tire with the ring therein is assembled with the mold sections, 16, 17 and bead clamping rings, 18, 19, as shown clearly in Fig. 1, the sealing ring being of such circumferential length in its normal expanded condition as to stand substantially in the position there indicated in broken lines, and of such size in cross section as to press the tire beads but lightly when in this position.

The tire is then vulcanized in accordance with any desired schedule of temperatures and pressures, the tire being subjected to internal pressure by conducting pressure fluid thereinto through the fluid inlet stem 14.

The pressure of the fluid upon the inner faces of the inner peripheral wall $10^a$ and the side walls $10^b$, $10^b$ of the ring forces it toward the bases of the bead portions of the tire with a wedging action, such movement and the incidental circumferential contraction of the member 10 being permitted by movement of the slidably mounted end of the bridge member 11 in the member 10, and the sealing ring thus applies to the bead portions of the tire a mechanical molding and sealing pressure which is in a general way proportional to the fluid pressure within the tire. An effective sealing of the tire is thus effected without such excessive, transversely directed pressure against the beads as to form them with ridges at the margins of the sealing ring. Pressure of the sealing ring against the tire also may be further limited by contact of the sealing ring against the bead clamping rings 18, 19, as shown in Fig. 1, the thickness of the bead portions of the tire being properly proportioned with relation to the sealing ring and molding members.

When a hot pressure fluid is used within the sealing ring and tire, heat is very effectively transferred therefrom to the bead portions of the tire through the thin side walls 10$^b$ of the ring, improving the vulcanization thereof.

I claim:

1. A sealing ring for tires comprising a hollow, longitudinally contractible annular structure of sheet metal adapted to be wedged between the bead portions of the tire by pressure fluid within the tire.

2. A sealing ring as defined in claim 1 in which the sheet metal structure is of substantially closed cross-sectional form except that its peripheral wall nearest the tread of the tire is so formed as to provide communication between the space within the said structure and the rest of the space within the tire.

In witness whereof I have hereunto set my hand this 17th day of July, 1925.

JOHN R. GAMMETER.